Dec. 27, 1966 W. M. OWENS, JR 3,294,207

REVERSE LOCKING MECHANISM

Filed April 23, 1965 4 Sheets-Sheet 1

INVENTOR
William M. Owens, Jr.
BY
W. H. Fincke Jr.
ATTORNEY

Dec. 27, 1966 W. M. OWENS, JR 3,294,207

REVERSE LOCKING MECHANISM

Filed April 23, 1965 4 Sheets-Sheet 2

INVENTOR

William M. Owens, Jr.

BY W. H. Finckel Jr.

ATTORNEY

REVERSE LOCKING MECHANISM

Filed April 23, 1965

INVENTOR
William M. Owens, Jr.
BY
ATTORNEY

Fig. 19.
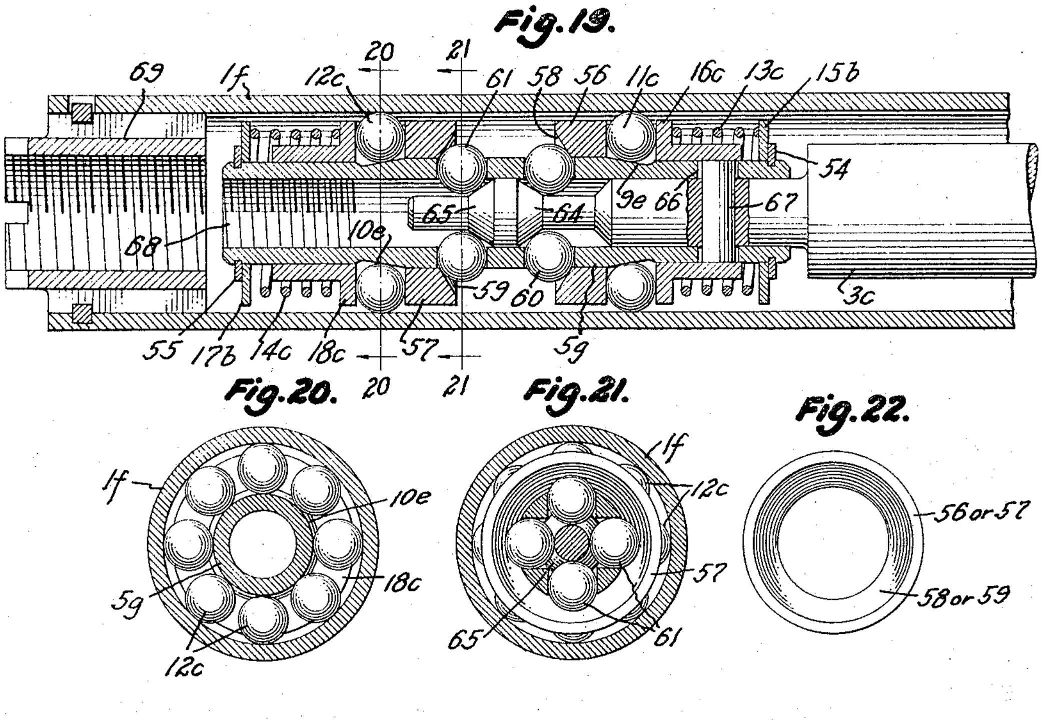
Fig. 20. Fig. 21. Fig. 22.
Fig. 23.
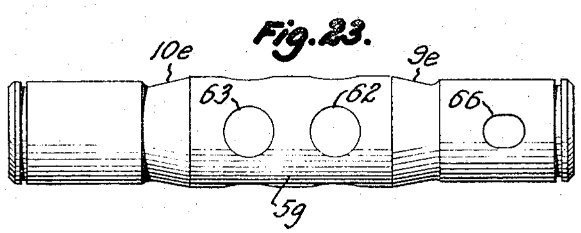
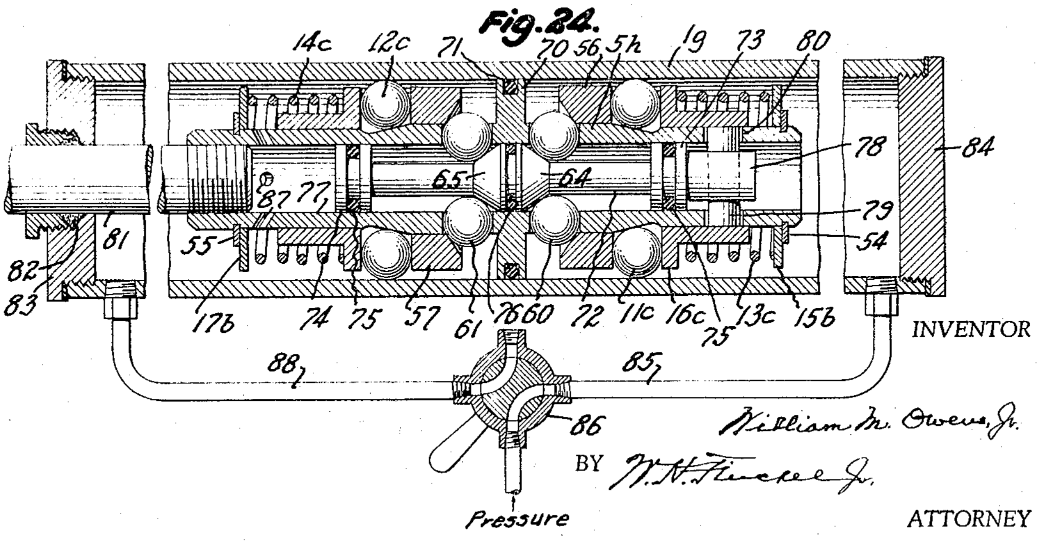
Fig. 24.
INVENTOR
William M. Owens, Jr.
BY W. N. Finckel Jr.
ATTORNEY

United States Patent Office 3,294,207

Patented Dec. 27, 1966

3,294,207

REVERSE LOCKING MECHANISM

William M. Owens, Jr., Smyrna, Ga., assignor to Scientific-Atlanta, Inc., Dekalb County, Ga., a corporation of Georgia

Filed Apr. 23, 1965, Ser. No. 450,455

4 Claims. (Cl. 192—8)

Figure 1:
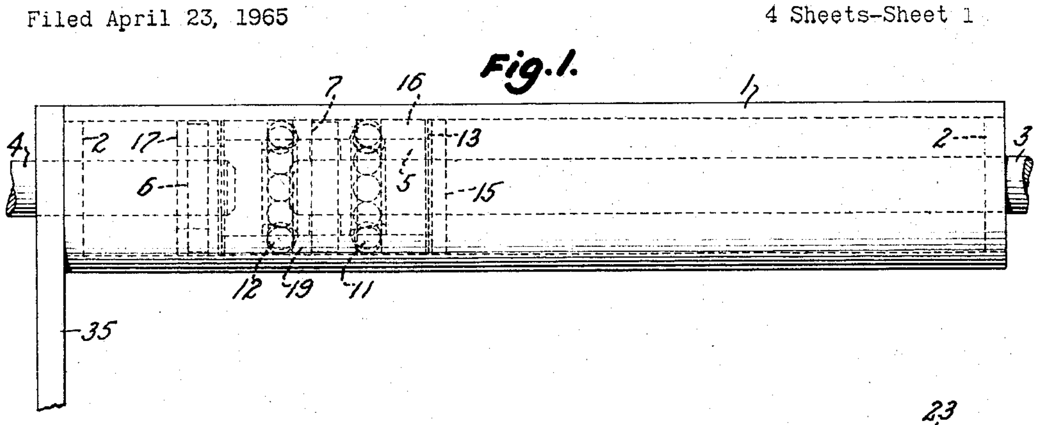

This invention relates to reverse locking mechanism, and particularly to mechanism for imparting motion from an actuating member to an actuated member whereby the actuated member may be moved by the actuating member in either of two directions, at will, but movement of the actuated member will be prevented in the event of application directly to it of a force tending to move it in either direction. Such mechanism has a variety of applications in use, such, for example, as in aircraft throttle controls, aircraft propeller controls, and any aircraft positioning controls where it is desirable to prevent creep or reverse movement. It is also susceptible of effective use in connection with boat throttles, tractor throttles, positioning controls, machine tool controls, and other mechanisms wherein a setting of a control member, without danger of its inadvertent movement under the influence of the controlled part, is desired. In other words, the mechanism of the invention will enable an operator to adjust the part to be controlled at a desired setting without danger of such setting being inadvertently disturbed, and to make subsequent adjustments, all such adjustments being made by actuation of the said actuating member.

Similar devices are broadly not novel, but in known devices, particularly those of the push-pull type, after a desired setting of the controlled part has been established by operation of the mechanism in one direction a separately operable manually controlled unlocking mechanism must be actuated in order to effect operation in a reverse direction.

One object of the present invention, therefore, is to provide a reverse locking mechanism in which movement of the actuating member, and hence of the actuated member, may be effected solely by actuation of such actuating member without recourse to any separate means for manually releasing the mechanism once its setting has been established as desired.

Another object of the invention is to provide a reverse locking mechanism of the push-pull type in which the actuating member may be either pushed or pulled by manual, mechanical or fluid-operated means to impart concomitant movement to the actuated member, and thereby to the part to be controlled, so that when the desired setting of the controlled part is attained such setting will be fixed and not susceptible of being disturbed by forces exerted by the controlled part on the actuated member, but only by subsequent actuation of the actuating member.

Another object of the invention is to provide a reverse locking mechanism of simple but efficient type, in which the actuating member and the actuated member are connected with, and move conjointly with, a reverse locking member comprising ball or roller clutch means cooperating with an enclosing guide member, and including means for effecting frictional or wedging, locking engagement of the ball or roller means with the guide member, and means actuated by the actuating member for releasing such engagement when such actuating member is either pushed or pulled to thereby free the clutch means for movement of the actuated member by the actuating member, the locking engagement of the clutch means being automatically restored when movement of the actuating member is terminated.

Figure 4:
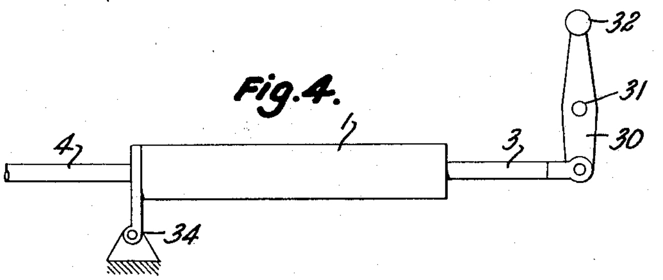
Figure 5:
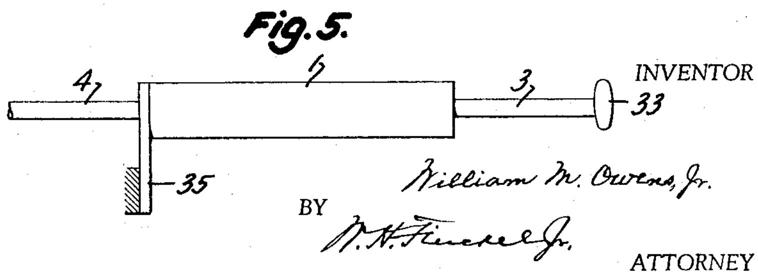
Figures 6, 7, 8, 9, 10, 11:
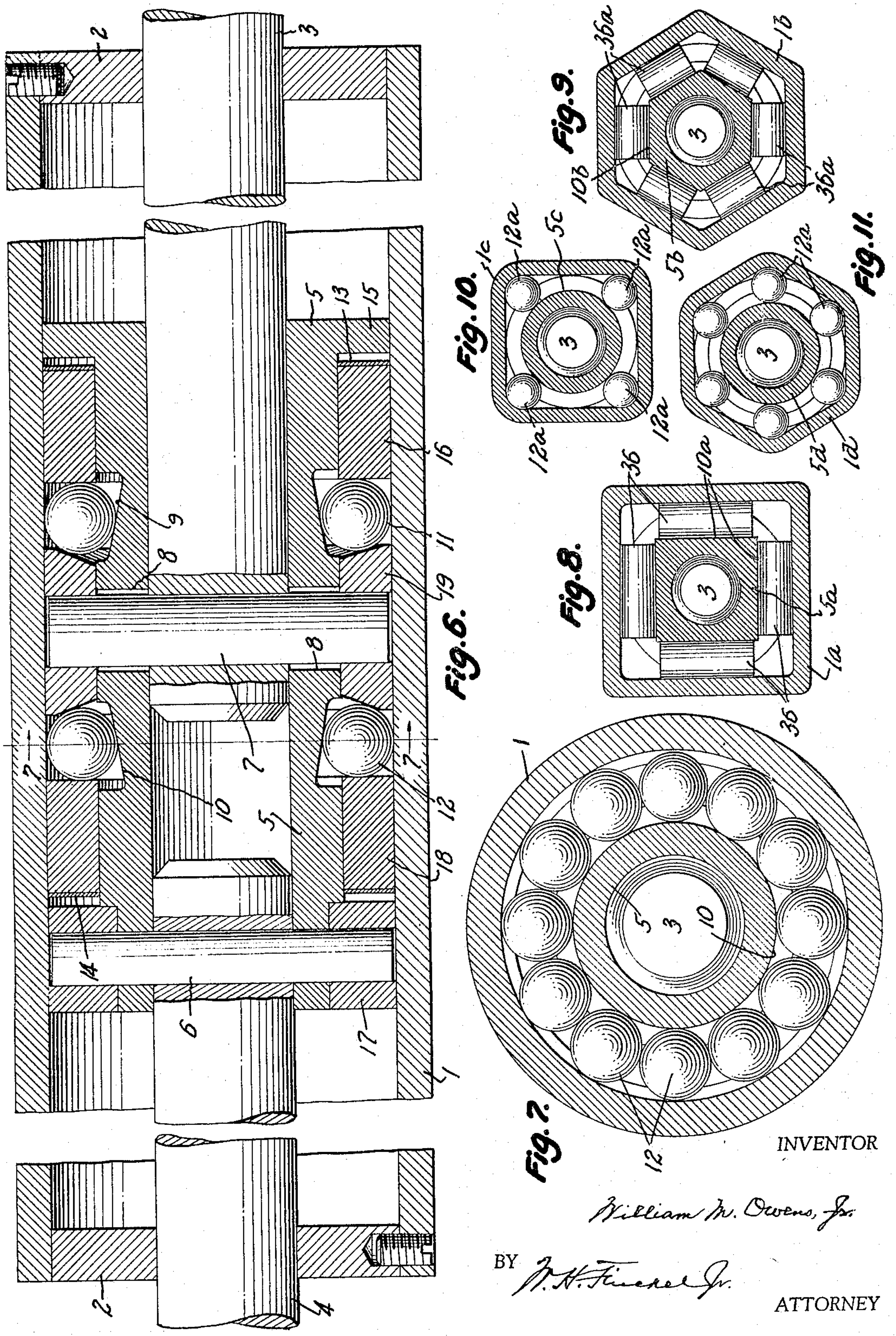
Figures 12, 13, 14, 15, 16, 17, 18:
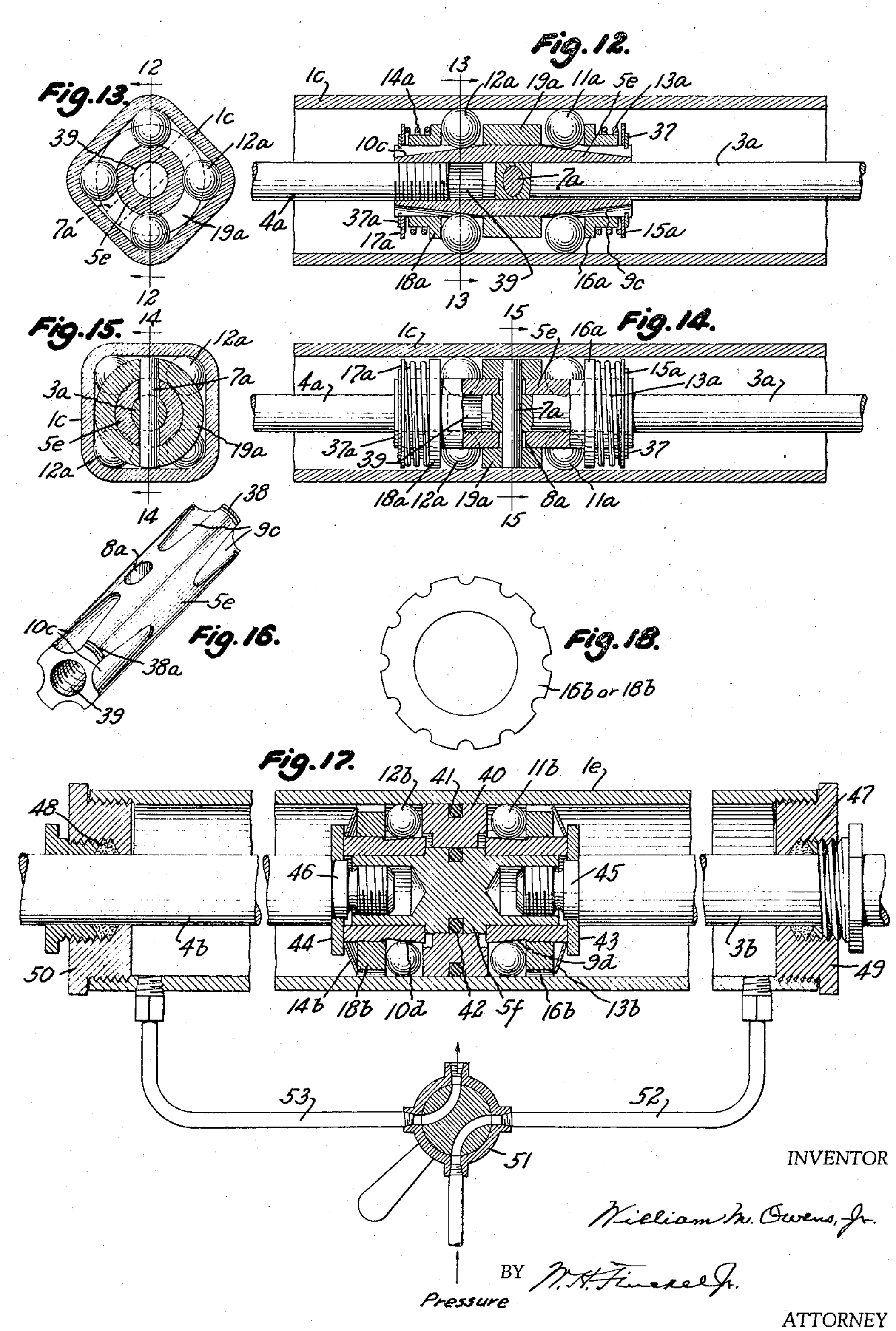

In the accompanying drawings illustrating the invention, in the several figures of which like parts are similarly designated, FIG. 1 is a side elevation of one preferred embodiment of the invention, with the clutch mechanism and associated part shown in broken lines, FIGS. 2, 3, 4, and 5 are schematic views showing, in side elevation, a number of optional mechanical and manual means for imparting reciprocating motion to the actuating member and thence to the actuated member, FIG. 6 is a greatly enlarged fragmentary axial sectional view, with parts in elevation, showing in detail operative parts of the clutch means, FIG. 7 is a transverse sectional elevation taken in the plane of line 7—7 of FIG. 6, FIG. 8 illustrates, in a sectional view similar to FIG. 7, a modification in which the guide member is square in cross section, rather than circular, and rollers are substituted for the clutch balls, FIG. 9 is a sectional view similar to FIGS. 7 and 8, but showing the guide member as hexagonal in cross section, and in which rollers are used in the clutch member, FIGS. 10 and 11 are views similar to FIGS. 8 and 9, respectively, but including balls, instead of rollers, in the clutch member, FIG. 12 is an axial sectional elevation showing a modification of the mechanism, in which a guide member square in cross section is used, and taken in the plane of line 12—12 of FIG. 13, FIG. 13 is a sectional elevation taken in the plane of line 13—13 of FIG. 12, FIG. 14 is an axial sectional elevation of the mechanism shown in FIGS. 12 and 13, but turned through an angle of 45°, and taken in the plane of line 14—14 of FIG. 15, FIG. 15 is a sectional elevation taken in the plane of line 15—15 of FIG. 14, FIG. 16 is a perspective view of the ball-contacting sleeve of the mechanisms shown in FIGS. 12 to 15, FIG. 17 is a view similar to FIG. 6, but showing a modification in which a pressure fluid may be employed for imparting reciprocative movement to the clutch means and to the actuated member, FIG. 18 is a face view of one of the ball-engaging ring members of the clutch means of FIG. 17, FIG. 19 is an axial sectional elevation showing a further modification of the clutch means and actuating mechanism therefor, FIG. 20 is a transverse sectional elevation taken in the plane of line 20—20, FIG. 19, FIG. 21 is a view similar to FIG. 20, but taken in the plane of line 21—21, FIG. 19, FIG. 22 is a face view of one of the actuating collars for the clutch means, FIG. 23 is a side elevation of the carriage member in the form shown in FIGS. 19 to 21, and FIG. 24 is an axial sectional elevation similar to FIG. 19, but showing the clutch mechanism thereof adapted for actuation by a pressure fluid.

Having reference particularly to FIGS. 1, 6 and 7, it will be seen that the mechanism of the invention includes a guide member 1 of cylindrical tube form provided with end caps 2 apertured to provide slide bearings for an actuating rod 3 and an actuated rod 4. The actuated rod 4 is rigidly connected with a reciprocable carriage member 5 by a cross-pin 6, and the actuating rod 3 is operatively associated with the carriage member 5 by a cross-pin 7 which is accommodated for limited axial movement with respect to the carriage member in diametrically opposite elongated slots 8 therein.

Axially spaced from the slots 8, the carriage member is provided with substantially conical ball seats 9 and 10 provided with circular sets of ball members 11 and 12, respectively, which are normally in contact with such seats and with the inner wall of the guide member 1, and the said balls are normally urged toward the bases of the seats by spring means 13 and 14, respectively, shown as flat spring washers or Belleville springs, which bear, respectively, against a flange 15 of the carriage member 5 and a slidable ring member 16 in contact with the ball members 11, and against a bushing 17 rigidly connected to the carriage member 5 by the cross-pin 6 and a slidable ring member 18, similar to the slidable ring member 16, and which is in contact with the ball members 12. Thus, normally, the spring means 13 and 14 function to urge the ball members to frictional seating against their respective conical seats and the inner wall of the guide member 1 to lock the carriage member 5 against movement axially of the guide member in either direction, thereby serving to maintain any predetermined setting or adjustment of the actuated rod 4 and of a control member or the like connected therewith and actuated thereby.

Slidable on the periphery of the carriage member 5 between the sets of ball members 11 and 12, and normally out of contact with the ball members, is a ball-release collar 19 fixedly connected with the actuating rod 3 by the cross-pin 7, and hence movable in either direction therewith axially of the guide member 1. This collar is preferably provided on its opposite axial faces with inwardly slanting, or conical, surfaces for appropriate operative contact with the ball members 11 and 12 of the relatively opposed sets.

In operation, it will be evident that when a push is exerted axially against the actuating rod 3 the cross-pin 7 will move the ball-release collar 19 to the left (FIG. 6) into contact with the set of ball members 12 to relieve their frictional locking contact with their conical seat 10 and the inner wall of the guide member 1. This movement is limited by the adjacent left-hand end walls of the slots 8 in the carriage member 5, and continued axial movement of the actuating rod 3 will therefore transmit its motion to the carriage member and therethrough, through the cross-pin 6, to the actuated rod 4 and thence to the control member or the like actuated thereby.

It will be understood, of course, that as the carriage member moves to the left the set of ball members 11 will be relieved of frictional engagement with the inner wall of the guide member 1 by slight travel to the right along their seat 9. It will be apparent, also, that as the sets of ball members 12 and 11 are thus moved and released from frictional engagement with the inner wall of the guide member 1 the spring means 14 and 13 will be slightly compressed by accommodating backing-off of the respective ring members 18 and 16.

Obviously, when pushing movement of the actuating rod 3 is arrested, the spring means 14 and 13 will serve to restore the sets of ball members 12 and 11, respectively, to frictional locking contact with the inner wall of the guide member 1, and any movement of the actuated shaft 4 in possible response to a force exerted upon it in either axial direction by the control member or the like connected with it will be prevented.

In view of the foregoing description of operation of the mechanism in response to a push upon the actuating rod 3, it is thought that its operation in response to a pull upon the actuating rod will be obvious, it being apparent that the axial movement of the actuating rod to the right will first release the frictional locking function of the set of ball members 11 under pressure against them of the ball-release collar 19, whereafter, upon engagement of the cross-pin 7 with the adjacent right-hand end walls of the slots 8 of the carriage member 5, this member, with the actuated rod 4, will be moved to the right and locked in adjusted position when pull upon the actuating rod 3 is terminated.

Having reference to FIGS. 2 to 5, it will be seen that a number of appropriate means for imparting push-pull movement to the actuating rod 3 are shown, but it will be understood that it is susceptible of actuation by other appropriate means, one of which is disclosed hereinafter particularly in reference to FIGS. 17 and 24.

Figure 2:
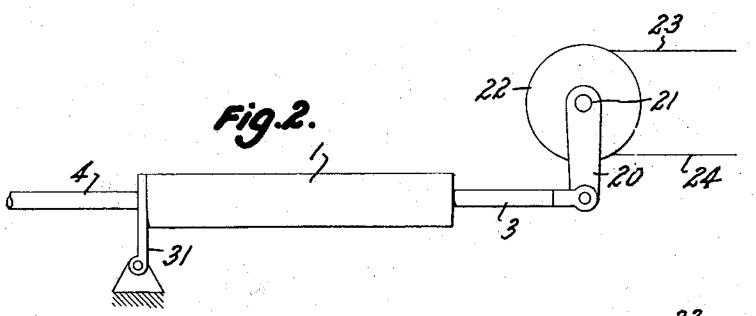

In FIG. 2 the actuating rod 3 is shown as connected with a lever 20 rigidly mounted on the oscillative shaft 21 of a cable drum 22. Obviously, as the drum 22 is oscillated by a pull upon its cable end 23 the rod 3 will be pushed, and if the pull is upon the cable end 24 the rod 3 will be pulled.

Figure 3:
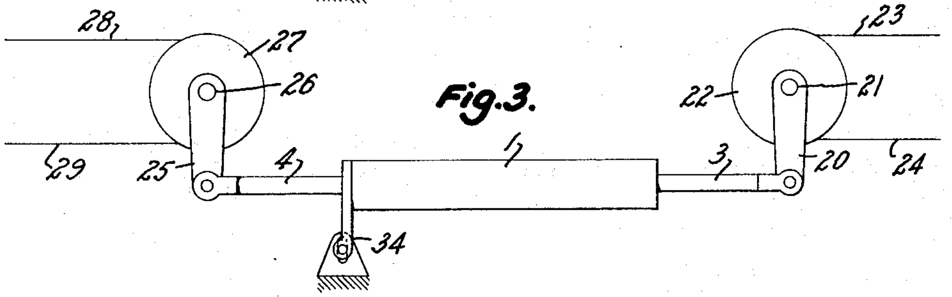

In FIG. 3 an arrangement similar to that of FIG. 2 is shown, but the actuated rod 4 is connected by a lever 25 to the oscillative shaft 26 of a drum 27 the cable ends 28 and 29 of which, when connected to the member to be controlled, will function to transmit the reciprocative motion of the actuated rod 4 to such member in response to oscillation of the lever 25 of the drum 27.

As shown in FIG. 4 the actuating rod 3 is connected to one end of a simple lever 30 having a pivot 31 and an operating handle 32.

In FIG. 5 the actuating rod 3 is provided with a hand knob 33 by means of which it may be pushed or pulled.

In FIGS. 2, 3 and 4 the guide member 1 is shown as provided with a pivotal mounting 34 in order to accommodate it to the oscillative movement of the levers 20, 25 and 30, but other means could be provided for this purpose, and the pivotal point of the mounting 34 could be shifted longitudinally with respect to the guide member. Also, the guide member 1 could be fixed and the ends of the levers 20, 25 and 30 could be slotted for connection with the pivot pins of the actuating members in a manner well known in the link and lever art.

In FIGS. 1 and 5 the guide member is shown as mounted upon a fixed supporting member 35.

As shown in FIGS. 8 to 11, the mechanism is capable of being adapted to other forms and arrangements of guide sleeve and friction elements than those shown particularly in FIGS. 1, 6 and 7.

In FIG. 8 the guide sleeve 1*a* is shown as of square cross section, with rollers 36 used as the friction elements instead of the balls shown in FIGS. 1, 6 and 7. Also, the carriage member 5*a* will be provided with flat slanted surfaces, as indicated at 10*a*, instead of the substantially conical surfaces 9 and 10 of the embodiment of FIGS. 1, 6 and 7, for carrying the rollers 36 in operative relation to the inner wall of the guide sleeve 1*a*.

In FIG. 9 the embodiment of rollers 36*a*, similar to those of FIG. 8, is shown in combination with a hexagonal guide sleeve 1*b*, and the carriage member 5*b* will have its roller-contacting surfaces flat, as shown at 10*b*.

In FIGS. 10 and 11 arrangements, as to guide members similar to those of FIGS. 8 and 9 are shown. In these forms balls 12*a*, rather than rollers, will be in contact with complementally curved interior surfaces at the inner angles of the guide members 1*c* and 1*d* (FIGS. 10 and 11), respectively. The carriage members 5*c* and 5*d*, FIGS. 10 and 11, respectively, may be of conical form or may have their ball-contacting surfaces as depressions appropriately angularly spaced circumferentially and substantially conforming in curvature to the curvature of the balls in the manner illustrated in FIG. 16.

Guide members of various other conceivable cross-sectional shape might be adapted, also, to the practice of the invention.

In FIGS. 12 to 16 an embodiment of the invention following, in major respects, the form shown in FIG. 10 is disclosed, but including changes in the elements, and the association thereof, particularly with respect to the assembly of the carriage member and its adjuncts.

In this embodiment (FIGS. 12 to 16), the guide member 1*c* is of square cross section with the balls 11*a* and 12*a* in contact with its complementally curved inner angles. The carriage member 5*e* (FIG. 16) is in the form of a simple cylinder with slanted seats 9*c* and 10*c* for the balls 11*a* and 12*a*, respectively, and ball-contacting shouldered sleeves 16*a* and 18*a* are assembled upon the opposite ends of the carriage member with helical compression springs 13*a* and 14*a* bearing against their shoulders and against stop collars 15*a* and 17*a*, respectively, removably secured in place by spring washers 37 and 37*a*, engaged in slots 38 and 38*a*, respectively (see FIG. 16), adjacent to the ends of the carriage member.

The carriage member 5*e* is provided with diametrically opposite axially extending slots 8*a* (FIGS. 14 and 16) for reception of the cross-pin 7*a* which carries the axially shiftable ball-release collar 19*a* and is rigidly carried by the actuating rod 3*a*. The actuated rod 4*a* is affixed to the opposite end of the carriage member 5*e* preferably by screw-threaded engagement in the axial bore 39 thereof.

Obviously, the embodiment of FIGS. 12 to 16 will function in the same manner as that of FIGS. 1, 6 and 7 in response to push-pull actuation of the actuating rod 3*a*, and movement of the actuated rod 4*a* in response to any force applied to it will be prevented.

In FIGS. 17 and 18 the mechanism shown has functional characteristics similar to those of the embodiments hereinbefore described, but the design and assembly of the operative elements are so modified as to make possible actuation of the device by a pressure fluid.

The carriage member 5*f* is slidable axially of the guide member 1*e* within a piston member 40 having packing means such as the O-rings 41 and 42 serving to provide seals between it and the guide member 1*e* and carriage member 5*f*, respectively. Carried on the carriage member 5*f* are ball seat members 9*d* and 10*d* provided with slanting, ball-wedging faces for the series of balls 11*b* and 12*b*, respectively, and these series of balls are normally urged toward, but not into contact with, the piston member 40, by slidable ring members 16*b* and 18*b* backed up by resilient members 13*b* and 14*b*, respectively, and having their peripheries notched (see FIG. 18) for the passage of pressure fluid into operative contact with the opposite axial faces of the piston member 40. The resilient members 13*b* and 14*b*, which may be spring washers or Belleville springs, the slidable ring members 16*b* and 18*b*, and the ball seat members 9*d* and 10*d*, are all held in proper assembly upon the end portions of the carriage member 5*f* by back-up plates or washers 43 and 44, bearing against the outer ends of the ball seat members 9*d* and 10*d*, respectively, and thus secured by the shouldered and screw-threaded ends 45 and 46 of a guide rod 3*b* and an actuated rod 4*b*, respectively.

The guide and actuated rods 3*b* and 4*b* pass, respectively, through packing gland means 47 and 48 in end caps 49 and 50 joined fluid-tight to the ends of the guide member 1*e*, and thus, when pressure fluid is introduced into the guide member adjacent to either of its ends, the chambers therein between the end caps 49 and 50 and the adjacent faces of the piston member 40 will provide power cylinders, it being understood, as hereinbefore mentioned, that such pressure fluid may reach the said faces of the piston member 40 by way of the notches in the peripheries of the slidable ring members 16*b* and 18*b*. Control of the pressure fluid for its introduction into and exhaust from these cylinders may be controlled by a suitable four-way valve 51 and appropriate conduit means such as the pipes 52 and 53 connected to the valve and to the chambers at the opposite ends of the guide member 1*e*.

It will be noted that the piston member 40 has a function similar to that of the ball-release collar 19 (FIG. 6) in that the first increment of its axial movement in either direction will serve to release the frictional engagement of the balls with the inner wall of the guide member 1*e*, and its continued movement will serve to impart reciprocative movement to the guide and actuated rods 3*b* and 4*b*, respectively.

If desired, the guide rod 3*b* may be dispensed with insofar as any function to move the carriage member 5*f* is concerned, but it is useful in providing a proper guide for reciprocative movement of this carriage member and of the piston member 40 carried thereby. Also, it may be made to function in the same manner as the actuated rod 4*b* if the axial position (end-for-end), of the device were for any reason reversed, the device, obviously, being similar in respect to both of its ends.

The operation of this modification of the embodiment of the invention, as shown in FIGS. 17 and 18, would appear to be obvious, it being understood that the introduction of pressure fluid into the cylinders formed at opposite ends of the guide member 1*e* will function to impart reciprocative axial movement to the carriage member 5*f* through similar movement of the piston member 40.

In the further modification of the invention illustrated in FIGS. 19 to 23, the carriage member 5*g* is provided with slanted or conical ball seating surfaces 9*e* and 10*e* which normally support the series of balls 11*c* and 12*c* in frictional engagement with the inner surface of the guide member 1*f* under the influence of ball engaging collars 16*c* and 18*c* backed up by compression springs 13*c* and 14*c* which bear against them and against stop collars 15*b* and 17*b* secured by spring washers 54 and 55 adjacent to the ends of the carriage member 5*g*.

Slidably mounted upon the carriage member 5*g* and normally in engagement with the balls 11*c* and 12*c* are ball-release collars 56 and 57 having substantially conical camming faces 58 and 59 for engagement with series of declutching or actuating balls 60 and 61 socketed in apertures 62 and 63 (see particularly FIG. 23) in the carriage member 5*g*, these balls 60 and 61 bearing against the substantially conical camming faces 64 and 65 of an inward extension of the actuating rod 3*c* which is connected by a lost-motion connection 66 and a cross-pin 67 with the carriage member 5*g* so that when the actuating rod 3*c* is moved axially in either direction the then operative camming face 64 or 65 of its extension will cause the series of actuating balls 60 or 61 to move radially outwardly and thus, through cooperation with the camming face 58 or 59 of the ball-release collar 56 or 57, cause the thus actuated release collar to release the series of balls 11*c* or 12*c* from frictional locking engagement with the inner surface of the guide member 1*f*, the lost-motion connection 66 affording the cross-pin 67 sufficient motion axially of the carriage member 5*g* to accommodate movement of the inward extension of the actuating rod 3*c* adequate for it to accomplish this release of the balls 11*c* or 12*c* prior to axial shifting of the carriage member by the actuating rod 3*c* through the functioning of the cross-pin 67.

The end of the carriage member 5*g* opposite that connected with the actuating rod 3*c* is adapted, preferably by the provision of a screw thread 68, for connection with a flexible shaft (not shown) of known form encased in a flexible tube (not shown) the end of which tube is secured in an appropriate fitting 69 carried in the end of the guide member 1*f*. A longitudinally rigid actuated member or shaft, such as that shown in FIGS. 1 to 17, and 18, could be employed instead of a flexible shaft, if desired. Obviously, upon cessation of movement of the actuating member, the spring 13*c* or 14*c* acting through the ball engaging collar 16*c* or 18*c* will cause the respective series of balls 11*c* or 12*c* to be restored to frictional locking engagement with the guide member 1*f* and, concomitantly, the ball-release collar 56 or 57, being moved axially of the carriage member 5*g* will restore the series of declutching balls 60 or 61 to their position of rest as shown in FIG. 19.

In FIG. 24 the embodiment of elements shown in FIGS. 19 to 23 is adapted for pressure fluid actuation in a manner somewhat similar to that disclosed in connection with the embodiment of FIGS. 17 and 18. Thus, in FIG. 24 the carriage member 5*h* is supplied, in addition to the elements disclosed in FIGS. 19 and 23, with a piston 70 provided with a suitable packing, such as an O-ring 71, and slidably bearing against the inner surface of the guide member 1*g*, and the reciprocative member 72 which carries the camming faces 64 and 65 for actuation of the respective series of declutching balls 60 and 61 is provided at its opposite ends with pistons 73 and 74, respectively, each provided, optionally, with a suitable packing, such as the O-rings 75, and the cylindrical portion of the reciprocative member 72 intermediate the camming faces 64 and 65 is furnished with a packing, such as the O-ring 76, which serves to prevent communication between the chambers at opposite ends of the guide member 1*g* by way of the apertures 62 and 63 in the carriage member 5*h*. The pistons 73 and 74, and the said cylindrical portion of the reciprocative member 72, thus have pressure retaining fits within, and are axially slidable in, the bore 77 of the carriage member 5*h*.

That end of the member 72 adjacent to the piston 73 is provided with an extension 78 carrying a cross-pin 79 having a lost-motion connection at 80 with the adjacent end of the carriage member 5*h*, and the opposite end of the carriage member is provided with a connection for an actuated member 81, such as a rod or the like, passing through a suitable packing gland 82 in the pressure-sealed end cap 83 of the guide member 1*g*. The opposite end of the guide member 1*g* is closed pressure tight by an end cap 84.

Pressure fluid introduced into the right-hand end (FIG. 24) of the guide member through the pipe 85 from the four-way valve 86 will fill the chamber of the guide member to the right of the pistons 70 and 73, and as it initially cannot cause the piston 70 and carriage member 5*h* to move to the left until the frictional locking engagement of the series of balls 12*c* with the guide member 1*g* is released, such release can be accomplished by the pressure-fluid movement of the piston 73 to the left so that the camming face 65 of the member 72 will activate the series of balls 61. It will be noted that, due to the presence of the actuated member 81 in the left-hand end of the carriage member 5*h*, a series of apertures, or bores, 87 is provided to admit pressure fluid entering the left-hand end chamber of the guide member 1*g* by way of the pipe 88 into operative engagement with the piston 74. Obviously, movement of the actuated member 81 to the right is thus accomplished in the same manner as is its movement to the left as just previously explained, with actuation of the declutching balls 60 by the camming face 64.

It will be noted that the operation of this FIG. 24 embodiment is somewhat different from that of the FIG. 17 embodiment in that the pressure fluid acting upon the piston 70 transmits its force directly to the carriage member 5*h* to move the same, rather than serving first to move this piston to release the frictional locking engagement of the series of balls 11*c* or 12*c* and then picking up the carriage member to move it, as is the case in the operation of the piston 40 of the FIG. 17 embodiment of the invention.

It should be noted that the friction elements, either balls or rollers, or their functional equivalents, 12 will move outwardly of the guide member with the actuated rod 4 only if they slide or roll along the inner wall surface of the guide member 1 which would necessitate their sliding on the cone surface 10 of the carriage member 5. The carriage member is so designed that the tangent of the angle between the cone surface and the inner wall surface of the guide member has a numerical value less than the coefficient of friction between the material of the balls, or the like, and the materials of the guide member and the cone surface of the carriage member. The force tending to move the actuated rod and carriage member outwardly will therefore produce a resultant or wedging force between the said cone surface, the balls or the like, and the guide member, which force, when multiplied by the coefficient of friction of the materials, is always greater than the force exerted directly upon and tending to move the actuated rod, and therefore the actuated rod cannot inadvertently be moved. The same applies to forces tending to push the actuated rod into the guide member, except that the locking function will be performed by the balls or the like 11 at the other end portion of the carriage member.

Various changes and modifications are considered to be within the principle of the invention and the scope of the following claims.

What I claim is:

1. In a reverse locking mechanism, a guide member of tubular form, means for closing the ends of said guide member to provide a fluid pressure tight chamber, a carriage member axially movable in said guide member, a piston member carried by said carriage member and serving to impart movement to said carriage member under the influence of pressure fluid introduced into said guide member, clutch means carried by said carriage member and normally cooperating in clutching engagement with the inner wall of said guide member, said clutch means being juxtaposed to opposite faces of said piston member, the clutch means being seated on said carriage member on inclined plane means whereby upon axial movement of said piston member disengagement of the clutch means with the inner wall of the guide member may be afforded, said piston member being mounted for such axial movement on said carriage member and upon initiation of its axial movement will cause one or the other of its opposite faces to contact said clutch means to free them from clutching engagement with the inner wall of said guide member, means for restoring said clutch means to said clutching engagement upon cessation of movement of said piston and carriage members, means for optionally introducing pressure fluid to either end of the chamber of said guide member and hence in operative relation to either face of said piston member to move the piston member in a chosen direction, and means connected with said carriage member and extending outwardly of an end of the guide member for transmitting the movement of said carriage member to means to be controlled by such movement.

2. In a reverse locking mechanism, a guide member, a carriage member capable of axial movement with respect to said guide member, means having a lost motion connection with and for imparting such axial movement to said carriage member and therethrough to a member to be controlled, and clutch means normally serving to prevent relative movement between said guide member and carriage member, said clutch means including two series of friction members in relatively spaced relation axially of said guide member and carriage member and provided with means for normally maintaining them in frictional engagement with said guide member and carriage member, and means for releasing such frictional engagement including two collar members axially slidable on said carriage member, one such collar member for each of said series of friction members and each having one axial face in juxtaposition to its respective series of friction members and its other axial face having a camming surface, two series of declutching members fixed axially of said carriage member but capable of radial movement with respect thereto, said declutching members being operatively associated with the camming faces of said collar members, and means operative in response to axial movement of said movement imparting means within the limits of said lost motion connection for imparting radial movement to said declutching members and therethrough to said collar members to release the frictional engagement of said friction members with said guide member, whereafter continued axial movement of said movement imparting means will function to axially move said carriage member and therethrough the member to be controlled in one or the other axial direction with respect to said guide member.

3. In a reverse locking mechanism as defined in claim 2, said guide member being of tubular form and enclosing said carriage member and clutch means, said friction members and said declutching members being balls, said carriage member being provided with camming surfaces upon which said friction members ride and which serve normally to urge the friction members into locking engagement with said guide member under the influence of said engagement maintaining means, and the means for imparting radial movement to said declutching members comprising a separate camming surface on said movement imparting means in engagement with each of said series of declutching members.

4. In a reverse locking mechanism as defined in claim 2, said guide member being of tubular form and enclosing said carriage member and clutch means and being pressure sealed at its ends to provide fluid pressure end chambers each of which is connected with a source of pressure fluid and means for introducing the pressure fluid into and exhausting it from such end chambers, the carriage member being provided with piston means working within said guide member and with an axial bore enclosing said means for imparting radial movement to said declutching members, and said radial movement imparting means being provided with piston means working in the bore of said carriage member and serving under the influence of pressure fluid to shift said radial movement imparting means axially of said bore to activate one or the other of said series of declutching members.

References Cited by the Examiner

UNITED STATES PATENTS

| | | | |
|---|---|---|---|
| 2,863,536 | 12/1958 | Cole | 192—8 |
| 2,883,016 | 4/1959 | Wassilieff | 192—8 |

FOREIGN PATENTS

| | | |
|---|---|---|
| 370,361 | 4/1939 | Italy. |

DAVID J. WILLIAMOWSKY, *Primary Examiner.*

A. T. McKEON, *Assistant Examiner.*